United States Patent
Yamashita et al.

(10) Patent No.: US 8,334,349 B2
(45) Date of Patent: *Dec. 18, 2012

(54) METHOD FOR PRODUCING THERMOPLASTIC COPOLYMER

(75) Inventors: Taro Yamashita, Penang (MY); Hajime Takamura, Tokyo (JP)

(73) Assignee: Toray Industries, Inc., Shiga (JP)

( * ) Notice: Subject to any disclaimer, the term of this patent is extended or adjusted under 35 U.S.C. 154(b) by 53 days.

This patent is subject to a terminal disclaimer.

(21) Appl. No.: 13/003,253

(22) PCT Filed: Jul. 7, 2009

(86) PCT No.: PCT/JP2009/062339
§ 371 (c)(1),
(2), (4) Date: Jan. 7, 2011

(87) PCT Pub. No.: WO2010/004977
PCT Pub. Date: Jan. 14, 2010

(65) Prior Publication Data
US 2011/0118424 A1     May 19, 2011

(30) Foreign Application Priority Data

Jul. 8, 2008   (JP) ................. 2008-177825

(51) Int. Cl.
*C08F 2/00*   (2006.01)
*C08F 12/28*  (2006.01)
*C08F 220/44* (2006.01)
*C08G 85/00*  (2006.01)

(52) U.S. Cl. .......... 526/64; 526/88; 526/310; 526/342

(58) Field of Classification Search .............. 526/64, 526/88, 342, 310
See application file for complete search history.

(56) References Cited

U.S. PATENT DOCUMENTS

| 4,141,934 A | 2/1979 | Wingler |
| 5,753,784 A * | 5/1998 | Fischer et al. ........... 526/64 |

FOREIGN PATENT DOCUMENTS

| EP | 541791 A1 * | 12/1990 |
| EP | 0541797 a1 | 5/1993 |
| EP | 0754707 A2 | 1/1997 |
| EP | 2248834 | 9/2009 |
| EP | 2248834 A1 * | 11/2010 |

(Continued)

OTHER PUBLICATIONS

Extended European Search Report, Application No. 09794421.9, dated Jul. 26, 2011.

(Continued)

*Primary Examiner* — William Cheung
(74) *Attorney, Agent, or Firm* — Pillsbury Winthrop Shaw Pittman LLP; Raj S. Dave

(57) ABSTRACT

A thermoplastic copolymer having an excellent balance among properties such as coating resistance, color stability and fluidity and having high operability and productivity can be obtained by a method for producing a thermoplastic copolymer, comprising step (I) of supplying a monomer mixture (a) containing an aromatic vinyl monomer (a1) and a vinyl cyanide monomer (a2) to a complete mixing type reactor continuously to produce a copolymer (A) and step (II) of supplying the copolymer (A) continuously to a tubular reactor with a static mixing structure therein, which is placed in series with the complete mixing type reactor, and reacting the copolymer (A) to produce a copolymer (B).

20 Claims, 1 Drawing Sheet

FOREIGN PATENT DOCUMENTS

| | | |
|---|---|---|
| JP | 51-119786 A | 10/1976 |
| JP | 5209108 A | 8/1993 |
| JP | 6016896 A | 1/1994 |
| JP | 7011099 A | 1/1995 |
| JP | 9031108 A | 2/1997 |
| JP | 9302197 A | 11/1997 |
| JP | 2000-226417 A | 8/2000 |
| JP | 2000-226417 A1 | 8/2000 |
| JP | 2009-191096 A | 8/2009 |

OTHER PUBLICATIONS

International Search Report in related application PCT/JP2009/062339 mailed Oct. 13, 2009.

* cited by examiner

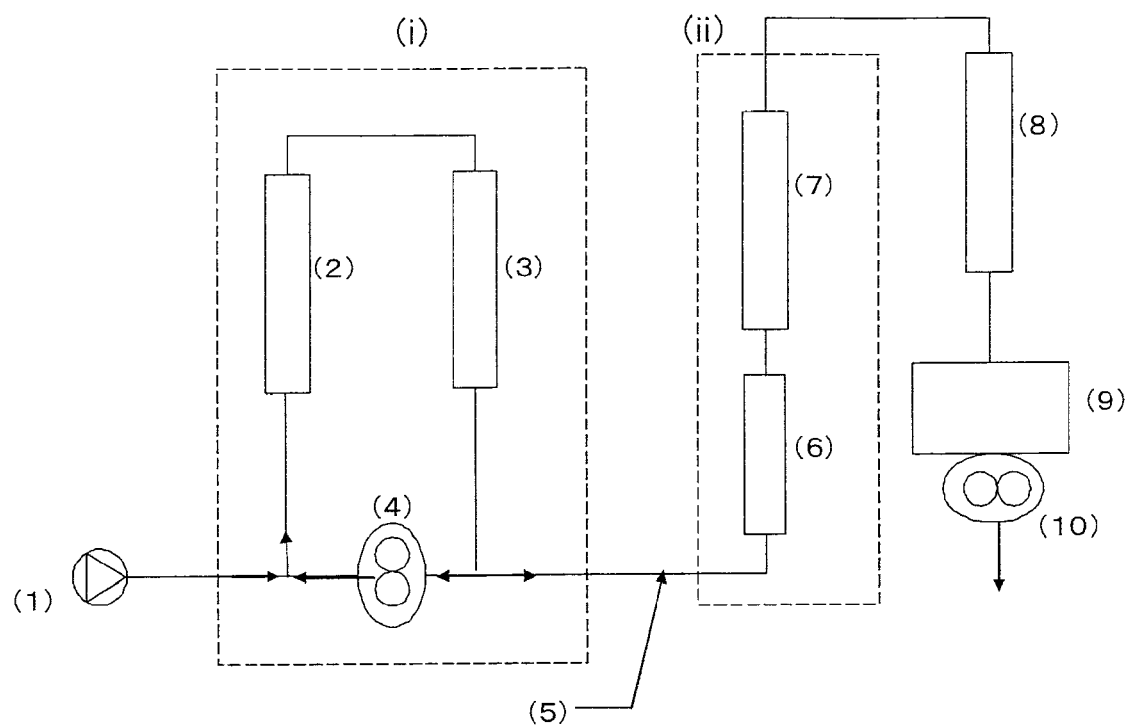

METHOD FOR PRODUCING THERMOPLASTIC COPOLYMER

CROSS REFERENCE TO RELATED APPLICATIONS

This application is a U.S. National phase of International Application No. PCT/JP2009/062339, filed Jul. 7, 2009, which in turn claims priority to Japanese Patent Application No. 2008-177825, filed on Jul. 8, 2008. The contents of each of which are incorporated herein by reference in their entirety.

TECHNICAL FIELD

The present invention relates to a method for producing a thermoplastic copolymer contained in a transparent thermoplastic resin composition which has an excellent balance among properties such as chemical resistance and color and has excellent molding processability and productivity.

BACKGROUND ART

Styrene-based resins represented by rubber-reinforcement styrene-based resins such as an ABS resin have been used in a wide range of fields including home electric appliances, office automation machines, and general merchandise, because the styrene-based resins have excellent mechanical properties, molding processability, and appearance trait. Particularly in a field of automobiles and motorcycles, the styrene-based resins are used in not only interior parts but also exterior parts because of advantages of light-weight, and in this case they are often subjected to coating.

Generally, in a styrene-based resin, it is known that coating resistance is improved by increasing a content of a vinyl cyanide monomer of a styrene-based copolymer in the styrene-based resin, and some methods of improving coatability by increasing an acrylonitrile content of an acrylonitrile-containing copolymer in an ABS resin, that is, by broadening a composition distribution of acrylonitrile, have been investigated. For example, in Patent Documents 1 to 3, there is proposed a method for specifying the acrylonitrile content in a rubber-containing graft copolymer and the acrylonitrile content in a styrene-base copolymer not containing rubber components. However, in this method, coatability and color stability at the time of melting are insufficient and it is necessary to polymerize, mix and extrude several kinds of styrene-base copolymer components having different acrylonitrile contents, and there is a problem that the productivity of ABS is significantly deteriorated.

In Patent Document 4, a copolymer produced by using suspension polymerization of a batch type is employed in order to broaden the composition distribution of acrylonitrile in a styrene-based copolymer, but since this method uses water, it requires separation, cleaning and drying of a polymer and is high in production cost. Moreover, in the suspension polymerization, since acrylonitrile remains excessively late in the polymerization because of limitations of reactivity ratio, polyacrylonitrile is produced and color tone is degraded, and a desired composition distribution cannot be achieved. Furthermore, the method includes an environmental problem that waste water of the steps contains acrylonitrile since unreacted acrylonitrile is dissolved in water.

In Patent Document 5, there is disclosed a method in which by forming an AS resin by the continuous polymerization using an apparatus which employs a hydrostatic mixer, polymerization stability at the high degree of polymerization, which is a problem for solution polymerization of an AS resin, can be improved, and an AS resin having excellent molding processability can be produced, but there is a problem that the polymerization cannot be stabilized due to high viscosity when the continuous polymerization is performed in a region of high vinyl cyanide monomer, and there is no report on the producing technology of broadening the composition distribution of acrylonitrile by use of continuous-type reactors.

PRIOR ART DOCUMENTS

Patent Documents

Patent Document 1: Japanese Patent Application Laid-Open No. 6-16896
Patent Document 2: Japanese Patent Application Laid-Open No. 7-11099
Patent Document 3: Japanese Patent Application Laid-Open No. 5-209108
Patent Document 4: Japanese Patent Application Laid-Open No. 9-302197
Patent Document 5: Japanese Patent Application Laid-Open No. 9-31108

DISCLOSURE OF THE INVENTION

Problems to be Solved by the Invention

The present invention has been achieved as a result of considering solutions for the above-mentioned problems in the prior art. That is, it is an object of the present invention to provide a method for producing a thermoplastic copolymer having a high content of cyanide monomer required to provide a coating-resistant thermoplastic resin composition which has an excellent balance among properties such as impact resistance, coating resistance, color stability and molding processability. Particularly, with respect to a high acrylonitrile-containing styrene-based resin contained in a coating-resistant ABS resin, it is an object of the present invention to provide a method for producing a thermoplastic copolymer capable of producing a high acrylonitrile-containing styrene-based resin in which a composition distribution is broadened, by a continuous reaction, improving the production efficiency and reducing an environmental burden.

Means for Solving the Problems

The present invention relates to a method for producing a thermoplastic copolymer described in the following (1) to (10).

(1) A method for producing a thermoplastic copolymer, comprising step (I) of continuously supplying a monomer mixture (a) containing an aromatic vinyl monomer (a1) and a vinyl cyanide monomer (a2) to a complete mixing flow reactor to produce a copolymer (A), and step (II) of supplying a polymerization solution containing the copolymer (A) to an extrusion flow reactor to further polymerize the copolymer (A) to produce a copolymer (B).

(2) The method for producing a thermoplastic copolymer according to (1), comprising step (III) of adding a monomer mixture (b) containing an aromatic vinyl monomer (b1) to the polymerization solution containing the copolymer (A) obtained in step (I).

(3) The method for producing a thermoplastic copolymer according to (1) or (2), wherein the complete mixing flow reactor in step (I) is a circulation-type loop reactor composed of two or more tubular reactors.

(4) The method for producing a thermoplastic copolymer according to any one of (1) to (3), wherein the complete mixing flow reactor in step (I) is a circulation-type loop reactor composed of two or more tubular reactors with a static mixing structure therein.

(5) The method for producing a thermoplastic copolymer according to any one of (1) to (4), wherein the extrusion flow reactor in step (II) is a serial type plug flow reactor composed of one or more tubular reactors with a static mixing structure therein.

(6) The method for producing a thermoplastic copolymer according to (4) or (5), wherein the tubular reactor with a static mixing structure therein has a structure having a multiple-unit curved tube and a heat transfer area per a unit volume is 50 $m^2/m^3$ or more.

(7) The method for producing a thermoplastic copolymer according to any one of (1) to (6), wherein the reaction is continued until the degree of polymerization of the copolymer (B) is 40 to 90% by weight in step (II).

(8) The method for producing a thermoplastic copolymer according to any one of (1) to (7), further comprising step (IV) of continuously volatilizing the copolymer (B) obtained in step (II) at a temperature of 100° C. or more and less than 300° C. with an atmospheric pressure (760 Torr) or less to separate an unreacted raw material mixture from the copolymer (B) and remove the unreacted raw material mixture.

(9) The method for producing a thermoplastic copolymer according to any one of (1) to (8), wherein the copolymer (B) is composed of 50 to 70 weight % of the aromatic vinyl compound and 30 to 50 weight % of the vinyl cyanide compound, and in the copolymer (B), the proportion of a copolymer having the vinyl cyanide composition, which is higher by 2 weight % or more than an average vinyl cyanide content, is 10 weight % or more.

(10) The method for producing a thermoplastic copolymer according to any one of (1) to (9), wherein the haze of the copolymer (B) is 5 or more.

Effect of the Invention

According to the present invention, a thermoplastic copolymer contained in a coating-resistant thermoplastic resin composition which has an excellent balance among physical properties such as impact resistance can be obtained. Further, in accordance with the present invention, since a composition distribution of a cyanide monomer of the thermoplastic copolymer can be broadened, it is not necessary to increase the content of the cyanide monomer of a styrene-based copolymer, for example, by polymerizing, mixing and extruding several kinds of the styrene-base copolymer components having different cyanide monomer contents, and the productivity of the styrene-based copolymer can be improved. Moreover, in accordance with the method for producing a thermoplastic copolymer of the present invention, it becomes possible to perform economically advantageous continuous polymerization stably even when the content of the copolymer is high to increase the viscosity of the polymerization solution. Further, in accordance with the method for producing a thermoplastic copolymer of the present invention, it becomes possible to reduce an environmental burden.

BRIEF DESCRIPTION OF THE DRAWING

FIG. 1 is a schematic diagram of the steps of a method for producing a thermoplastic copolymer composed of a loop reactor and a plug flow reactor.

MODE FOR CARRYING OUT THE INVENTION

Hereinafter, a method for producing a thermoplastic copolymer according to the present invention will be described in detail.

The present invention relates to a method for producing a thermoplastic copolymer in which a copolymer (B) is continuously produced from an aromatic vinyl monomer and a vinyl cyanide monomer by the concurrent use of a complete mixing flow reactor and an extrusion flow reactor.

In continuous type reactors, there are two ideal model of a complete mixing flow and an extrusion flow. The complete mixing flow is a model in which components in the reactor are completely uniform and supplied raw materials are immediately mixed in this uniform state. The extrusion flow is a model in which supplied raw materials are not mixed with the raw materials supplied previously or thereafter and a reaction fluid flows through a reactor like a stream in a tube.

In the present invention, first, (I) a monomer mixture (a) containing an aromatic vinyl monomer (a1) and a vinyl cyanide monomer (a2) is continuously supplied to a complete mixing flow reactor to form a copolymer (A). Step (I) of the present invention will be described.

As the complete mixing flow reactor in step (I) of the present invention, a mixed type polymerization tank, which has a variety of mixing impeller, for example, a paddle impeller, a turbine impeller, a propeller impeller, a Brumagin type impeller, a multi step impeller, an anchor impeller, a MAX-BLEND impeller and a double helical ribbon impeller, can be used and as for a configuration, a variety of tubular, and tower reactors, etc. can be used. These polymerization tanks (reactors) are used either alone or with one another, and two or more types of tanks are used in combination as required. Among these, it is preferable to use a circulation-type loop reactor composed of two or more tubular reactors as a complete mixing flow reactor. Further, a continuous agitation tank, a common reactor, may be used as a complete mixing flow reactor, but it is preferable to use a circulation-type loop reactor composed of one or more tubular reactors with a static mixing structure therein since this reactor enables the complete mixing flow and economically advantageous continuous polymerization can be performed stably even when the content of the copolymer is high and the viscosity of the polymerization solution is increased.

The tubular reactor with a static mixing structure preferably used in the present invention is a tubular reactor in which a plurality of mixing elements not having a movable portion is fixed internally, (a tubular reactor with a static mixing element therein). Preferably, bulk polymerization or solution polymerization is carried out continuously while carrying out static mixing through the tubular reactor, thereby allowing continuous polymerization in high polymer concentration regions to be achieved, which has not been able to be achieved in the past. Furthermore, since high thermal conduction is achieved by a combination with a large surface of internal heat exchange, it becomes possible to perform an exothermic polymerization reaction, which is extremely rigid under heat control, without fear of formation of hot spots. Moreover, the tubular reactor having a static mixing structure therein preferably has a multiple-unit curved tube for the purpose of increasing a heat exchange surface area to improve mixing properties. The heat transfer area per unit volume of the tubular reactor used in the present invention is preferably 10 $m^2/m^3$ or more, more preferably 30 $m^2/m^3$ or more, and furthermore preferably 50 $m^2/m^3$ or more.

In the tubular reactor with a static mixing structure therein in the present invention, a temperature distribution in a pipe at the time of polymerization, which is represented by a relational expression of ([internal temperature]−[wall temperature])/([average internal temperature]−[wall temperature]) is preferably 0 to 1.2. If the temperature distribution is 1.2 or more, thermal conduction efficiency is low, hot spots may be formed, and thermal control of polymerization reaction may become difficult.

Examples of a plurality of mixing elements fixed to the inside of the tubular reactor with a static mixing structure therein, include a mixing element which divides the flow of a polymerization solution flowing into a tube and changes a direction of the flow, and repeat the division and confluence, thereby forming a turbulent flow to mix the polymerization solution. Examples of such a tubular reactor preferably include a static mixer, and specific examples of the static mixer include SMX-type or SMR-type Sulzer tubular mixers, Kenics static mixers, Toray tubular mixers, or the like. Particularly, SMX-type or SMR-type Sulzer tubular mixers are preferable.

The tubular reactor with a static mixing structure therein in the present invention is preferably composed of at least a reactor in which at least a structure for hydrostatic mixing, where a liquid heat transfer medium flows through an internal coil for the purpose of increasing the effective reaction volume, is disposed. These reactors are used either alone or with one another, and two or more types of reactors can be used in combination as required.

In the present invention, the pressure within the tubular reactor with a static mixing structure therein at the time of polymerization is preferably a vapor pressure of the reaction solution or more. The pressure within the tubular reactor is preferably 1 to 40 kg/cm$^2$G and a vapor pressure of the reaction solution or more. By keeping the pressure within the reactor at a pressure of 1 to 40 kg/cm$^2$G and a vapor pressure of the reaction solution or more, foaming of the reaction solution can be suppressed and a blockage due to the foaming can be prevented.

In the present invention, furthermore preferably, the reflux ratio (R=F1/F2) falls within the range of 5 to 30 when the flow rate of a mixture solution refluxed in a circulation-type loop reactor, which is composed of one or more tubular reactors with a static mixing structure therein as the complete mixing flow reactor in step (I), is denoted by F1 (liter/time) whereas the flow rate of a mixture solution flowing out from the complete mixing flow reactor in step (I) into the extrusion flow reactor in step (II), which is placed in series with the complete mixing flow reactor, is denoted by F2 (liter/time). If the reflux ratio is less than 5, the degree of polymerization has a distribution produced in the loop reactor and the reactor does not perform the function as a complete mixing equipment which is an object of the present invention. If the reflux ratio is more than 30, the residence time in the loop reactor is longer and at risk for polymerization runaway, and large-scale equipment investment is required to circulate a large amount of polymerization solution. Therefore these cases are not preferable. Further, if the reflux ratio is kept constant in the range of 5 to 30, since uniform mixing becomes possible and a homogeneous polymerization solution is achieved, it is more preferable.

In order to regulate the flow rate of a mixture solution refluxed in a circulation-type loop reactor, which is composed of one or more tubular reactors with a static mixing structure therein, a circulation pump may be installed in the circulation-type loop reactor. For the circulation pump used herein, a known gear pump is preferably used to regulate the flow rate of the polymerization solution, because the viscosity of the polymerization solution to be used is high.

The viscosity of the polymerization solution of the copolymer (A) in step (I) is preferably 50 to 3000 poise, and more preferably 100 to 2000 poise. If the viscosity is less than 50 poise, the stability of solution pumping for circulation is deteriorated, and in particular, when the SMX-type or SMR-type Sulzer tubular mixers are used, there is a possibility that the complete mixing flow cannot be kept. If the viscosity is more than 3000 poise, the viscosity of the polymerization solution in the reactor may be increased, possibly leading to breakdown of the circulation pump or supply pump for keeping the complete mixing flow.

Examples of the aromatic vinyl monomer (a1) include styrene, α-methylstyrene, p-methylstyrene, vinyltoluene, t-butylstyrene, o-ethylstyrene, o-chlorostyrene, o,p-dichlorostyrene, and a mixture of two or more of these monomers, and particularly, styrene or α-methylstyrene is preferably used.

Examples of the vinyl cyanide monomer (a2) include acrylonitrile, methacrylonitrile, ethacrylonitrile, and a mixture of two or more of these monomers, and particularly acrylonitrile is preferably used.

In step (I) of the present invention, the monomer mixture (a) may be composed of the aromatic vinyl monomer (a1) and the vinyl cyanide monomer (a2), or may contain another monomer (a3) in addition to the aromatic vinyl monomer (a1) and the vinyl cyanide monomer (a2). Examples of another monomer (a3) include an unsaturated carboxylic acid such as an acrylic acid and a methacrylic acid, an unsaturated dicarboxylic acid such as a maleic acid, an unsaturated dicarboxylic acid anhydride such as a maleic anhydride, N-substituted maleimide such as N-phenyl maleimide and an unsaturated amide such as an acrylamide. Another monomers (a3) may be used alone or in combination of two or more thereof.

In step (I) of the present invention, the monomer mixture (a) is preferably a vinyl-based monomer mixture composed of 10 to 70 weight % of the aromatic vinyl compound unit (a1), 10 to 60 weight % of the vinyl cyanide compound unit (a2) and 0 to 50 weight % of the other monomer (a3) which can be copolymerized with the monomers (a1) to (a2) from the viewpoint of a balance among properties such as coating resistance, impact resistance and rigidity. When the content of the vinyl cyanide-based monomer is less than 10% by weight, the coating resistance of the coating-resistant thermoplastic resin composition formed by use of the resulting thermoplastic copolymer is insufficient, and when the content is more than 60% by weight, the color stability of the resin composition is deteriorated, and therefore these cases are not preferable.

In step (I) of the present invention, it is preferable that the monomer mixture (a) containing the aromatic vinyl monomer (a1) and the vinyl cyanide monomer (a2) is continuously supplied to a complete mixing flow reactor to polymerize these monomers till the degree of polymerization of the copolymer (A) is 20 to 70% by weight. In a more preferable aspect, the degree of polymerization of the copolymer (A) is 30 to 70% by weight. When the degree of polymerization of the copolymer (A) is less than 20% by weight, or more than 70% by weight, it is difficult to control the polymerization reaction and there may be cases where the copolymer (A) having a preferable composition described later cannot be obtained.

As a method of adjusting the degree of polymerization of the copolymer (A), known polymerization technologies can be applied. The degree of polymerization can be adjusted to an intended level by changing a residence time in the reactor, and polymerization temperature and a concentration of an initiator. When the degree of polymerization is decreased, it can be adjusted by reducing the residence time in the reactor, increasing an amount of a polymerization catalyst and decreasing the polymerization temperature and the concentration of an initiator. When the degree of polymerization is increased, it can be adjusted by extending the residence time in the reactor, reducing an amount of a polymerization catalyst and increasing the polymerization temperature and the concentration of an initiator.

In the present invention, it is preferable to add the monomer mixture (a) in the process in which the monomer mixture (a) is continuously supplied to the complete mixing flow reactor in step (I) to perform the continuous bulk polymerization or continuous solution polymerization.

In the case of selecting the continuous solution polymerization as the polymerization reaction in step (I), in addition to the monomers described above, a solvent is used. The solvent used can contain saturated water. In the case of using the solvent, the solvent may be, for example, hydrocarbon system solvents such as toluene, ethylbenzene, and xylene, and polar solvents such as methyl ethyl ketone, methyl isobutyl ketone, butyl alcohol, and tetrahydrofuran. Among these solvents, the polar solvents are preferable, more preferably, solvents with a ketone group such as methyl ethyl ketone and methyl isobutyl ketone, and even more preferably, methyl ethyl ketone in terms of the solubility of the copolymer (A). The organic solvent supplied to the complete mixing tank is preferably a polar solvent. The amount of the organic solvent supplied to the complete mixing flow reactor in step (I) is preferably 1 to 50 parts by weight, more preferably 1 to 30 parts by weight, and further more preferably 1 to 20 parts by weight with respect to 100 parts by weight of a total amount of the monomers added in all steps of the present invention.

The polymerization temperature in the complete mixing flow reactor in step (I) is preferably 70 to 120° C., and more preferably 90 to 115° C. The polymerization temperature of 70 to 120° C. reduces the amount of the unreacted acrylonitrile and a copolymer (B) with a broad composition distribution can be obtained.

The average residence time of the polymerization step through the complete mixing flow reactor in step (I) is determined by the targeted degree of polymerization, the polymerization temperature, the type and usage of an initiator, and preferably falls within the range of 0.5 to 4 hours, more preferably within the range of 1 to 3 hours. By setting the average residence time at times within this range, the polymerization control is stabilized, and a copolymer containing a high content of acrylonitrile component can be produced. When the residence time is shorter than 0.5 hours, a used amount of a radical polymerization initiator needs to be increased and the control of a polymerization reaction may become difficult.

With respect to the composition of the copolymer (A) obtained in accordance with step (I) of the present invention, preferably, the aromatic vinyl compound is 45 to 75 weight % and the vinyl cyanide compound is 30 to 55 weight %, and more preferably, the aromatic vinyl compound is 50 to 65 weight % and the vinyl cyanide compound is 35 to 50 weight %. In the copolymer (A), the proportion of a copolymer having the vinyl cyanide composition, which is higher by 2 weight % or more than an average vinyl cyanide content, is less than 10 weight % and the copolymer (A) is characterized by having a higher content of vinyl cyanide compound and a narrower composition distribution of vinyl cyanide compound than those of a copolymer (B) obtained in step (II) described later.

Subsequently, step (II) of the present invention will be described. In the present invention, in step (II), the polymerization solution containing the copolymer (A) obtained in step (I) is supplied to the extrusion flow reactor to further polymerize the copolymer (A) to produce the copolymer (B). According to step (II) of the present invention, the composition distribution of a vinyl cyanide compound in the thermoplastic copolymer can be further broadened.

As the extrusion flow reactor in step (II), a variety of tubular, and tower reactors, etc. can be used. In addition, kneader type reactors, twin screw extruder, etc. can be used as the polymerization reactor. These reactors are used either alone or with one another, and two or more types of reactors are used in combination as required. Among these, it is preferable to use a serial type plug flow reactor composed of one or more tubular reactors with a static mixing structure therein as an extrusion flow reactor. In addition, to the tubular reactor with a static mixing structure therein preferably used in step (II), the specification in step (I) is preferably applied, but it is not necessary to apply the same specification. Further, the pressure within the tubular reactor with a static mixing structure therein preferably used in step (II) is also preferably similar to the pressure in step (I), but it is not necessary to be the same.

The operation of extracting the copolymer (A) from the complete mixing flow reactor in step (I) and sending the extracted copolymer (A) to the extrusion flow reactor in step (II) can be carried out by use of, for example, a pump. The pump is preferably a commercially available gear pump. The extraction of the reaction solution by the pump enables to send the reaction solution stably toward the subsequent step, and increase the pressure in the extrusion flow reactor subsequently disposed to the vapor pressure of the reaction solution or more.

The viscosity of the copolymer (B) in step (II) is preferably 50 to 5000 poise, and more preferably 300 to 4000 poise. If the viscosity is less than 50 poise, there is a possibility that it will be difficult to mix a polymerization solution by dividing the flow of a polymerization solution flowing into a tube and changing the direction of the flow, and repeating the division and confluence, thereby forming a turbulent flow, in particular, when the SMX-type and SMR-type Sulzer tubular mixers are used. Further, if the viscosity is more than 5000 poise, the viscosity of the polymerization solution in the reactor is increased, resulting in the inability to send the polymerization solution to the subsequent step, and possibly leading to failures of the tubular mixers.

In the present invention, the composition distribution of a vinyl cyanide compound in the thermoplastic copolymer can be further broadened by preferably providing, between step (I) and step (II), step (III) of adding an monomer mixture (b) containing an aromatic vinyl monomer (b1) to the polymerization solution containing the copolymer (A).

Examples of the aromatic vinyl monomer (b1) include styrene, α-methylstyrene, p-methylstyrene, vinyltoluene, t-butylstyrene, o-ethylstyrene, o-chlorostyrene, and o,p-dichlorostyrene, and particularly, styrene or α-methylstyrene is preferably used. The aromatic vinyl monomers (b1) maybe used alone or maybe used in combination of two or more of these monomers.

The monomer mixture (b) may contain a vinyl cyanide compound unit (b2) and another monomer (b3) which can be copolymerized with these units in addition to the aromatic vinyl compound unit (b1).

Examples of the vinyl cyanide monomer (b2) include acrylonitrile, methacrylonitrile, and ethacrylonitrile, and particularly acrylonitrile is preferably used. The vinyl cyanide monomers (b2) may be used alone or in combination of two or more of these monomers.

Examples of another monomer (b3) include an unsaturated carboxylic acid such as an acrylic acid and a methacrylic acid, an unsaturated dicarboxylic acid such as a maleic acid, an unsaturated dicarboxylic acid anhydride such as a maleic anhydride, N-substituted maleimide such as N-phenyl maleimide and an unsaturated amide such as an acrylamide. Another monomers (b3) may be used alone or in combination of two or more thereof.

The monomer mixture (b) is preferably a vinyl-based monomer mixture composed of 1 to 45 weight % of the aromatic vinyl monomer (b1), 1 to 10 weight % of the vinyl cyanide monomer (b2) and 1 to 50 weight % of the other monomer (b3) which can be copolymerized with the monomers (b1) to (b2) from the viewpoint of a balance among properties such as coating resistance, impact resistance and rigidity.

The amount of the supplied monomer mixture (b) in step (III) is preferably 3 to 50 weight % with respect to 100 weight % of the total of the monomer mixture (a) and the monomer mixture (b).

In the present invention, various organic solvents, polymerization initiators, chain transfer agents, antioxidants, and thermal stabilizers can be supplied to the extrusion flow reactor in step (II) in addition to the polymerization solution and the monomer mixture (b) from the complete mixing flow reactor in step (I).

The organic solvent supplied to the extrusion flow reactor in step (II) is preferably a polar solvent. The organic solvent may be equal to or different from the organic solvent supplied to the complete mixing flow reactor in step (I), but an organic solvent equal to the organic solvent supplied to the complete mixing flow reactor in step (I) is preferably used from the viewpoint of ease of separating a volatile fraction. The amount of the organic solvent supplied to the extrusion flow reactor in step (II) is preferably 1 to 50 parts by weight, more preferably 1 to 30 parts by weight, and furthermore preferably 1 to 20 parts by weight with respect to 100 parts by weight of the total amount of the monomers added in all steps of the present invention.

With respect to the polymerization initiators, chain transfer agents, antioxidants, and thermal stabilizers supplied to the extrusion flow reactor in step (II), examples of the antioxidants include hindered phenolic antioxidants, sulfur-containing organic compound-based antioxidants, and phosphorus-containing organic compound-based antioxidants, and examples of the thermal stabilizers include phenolic thermal stabilizers and acrylate-based thermal stabilizers. The amount of the supplied antioxidant or thermal stabilizer is preferably 0 to 2 weight % with respect to the monomer mixture (b). As the method for adding the antioxidant or thermal stabilizer, for example, preferably used is a method of adding the antioxidant or thermal stabilizer from a side line provided at an inlet of a tubular reactor, or a method of introducing the antioxidant or thermal stabilizer into the extrusion flow reactor in step (II) after preparatory mixing in a separate static mixer disposed serially at an inlet of the tubular reactor. Further, when the organic solvent is supplied to the extrusion flow reactor in the step (II), polymerization initiators, chain transfer agents, antioxidants, and thermal stabilizers can be mixed into the organic solvent also as required.

It is preferable to react the polymerization solution until the degree of polymerization of the copolymer (B) in the extrusion flow reactor in step (II) is 40 to 90% by weight. The degree of polymerization of the copolymer (B) is more preferably 45 to 85% by weight. By reacting the polymerization solution until the degree of polymerization of the copolymer (B) is 40 to 90% by weight, the composition distribution of the vinyl cyanide compound of the copolymer (B) formed by polymerization using the extrusion flow reactor in step (II), which is placed in serial with the complete mixing flow reactor in step (I), is broadened and the intended thermoplastic copolymer is obtained. Here, adjusting of the degree of polymerization of the copolymer (B) can be performed out by the method of adjusting the degree of polymerization in the copolymer (A) described above.

The polymerization temperature in the extrusion flow reactor in step (II) is preferably 70 to 200° C., more preferably 90 to 180° C., and furthermore preferably 100 to 160° C. When the polymerization temperature is 70° C. or less, productivity cannot be secured since a polymerization rate is low, and the composition distribution of the copolymer may be insufficient. Further, when the polymerization temperature is 200° C. or more, a reaction rate is significantly fast and the copolymer (B) adheres to the static mixing structure as scales and there may cause a problem in production stability.

The average residence time of a reaction solution in the extrusion flow reactor in step (II) is preferably 0.01 to 120 minutes. A more preferable average residence time is 0.1 to 90 minutes, and when the average residence time is less than 0.01 minutes, the degree of polymerization cannot be adequately increased. On the other hand, when the average residence time is more than 120 minutes, it is not preferable since thermal stability of the copolymer (B) to be ultimately obtained is deteriorated and productivity may be deteriorated.

In the present invention, the rate of generating the copolymer (B) from the monomers added in all steps, or the polymer generation rate, is preferably 10%/h or more. When the polymer generation rate is less than 10%/h, the productivity may be decreased, reducing the merit of the continuous polymerization.

In the method for producing a thermoplastic copolymer of the present invention, the copolymers (A) and (B) can be produced by thermal polymerization without the use of a polymerization initiator or by polymerization with the use of a polymerization initiator, or further can be produced by the combined use of the thermal polymerization and the polymerization with a polymerization initiator. As the polymerization initiator, peroxides, azo-based compounds, or the like are used.

Specific examples of the peroxides include benzoyl peroxide, cumene hydroperoxide, dicumyl peroxide, diisopropylbenzene hydroperoxide, t-butyl hydroperoxide, t-butylcumyl peroxide, t-butyl peroxy acetate, t-butyl peroxy benzoate, t-butyl peroxy isopropyl carbonate, di-t-butyl peroxide, t-butyl peroctoate, 1,1-bis(t-butyl peroxy)3,3,5-trimethyl cyclohexane, 1,1-bis(t-butyl peroxy) cyclohexane, and t-butyl peroxy-2-ethylhexanoate and the like.

In addition, specific examples of the azo-based compounds include azobisisobutylonitrile, azobis(2,4-dimethylvaleronitrile), 2-phenylazo-2,4-dimethyl-4-methoxyvaleronitrile, 2-cyano-2-propylazoformamide, 1,1'-azobiscyclohexane-1-carbonitrile, azobis(4-methoxy-2,4-dimethylvaleronitrile), dimethyl 2,2'-azobisisobutylate, 1-t-butylazo-1-cyanocyclohexane, 2-t-butylazo-2-cyanobutane, and 2-t-butylazo-2-cyano-4-methoxy-4-methylpentane and the like.

Among these, compounds for which the temperature for the half-life of 10 hours is 70 to 120° C. are preferable, more preferably 80 to 100° C., as the polymerization initiator, and a peroxide-based polymerization initiator, 1,1-bis(t-butylperoxy)cyclohexane is particularly used preferably.

In the case of using these polymerization initiators, the polymerization initiators can be used singly, or in combination of two or more of the polymerization initiators. In the case of using two or more of the polymerization initiators, it is preferable to use the polymerization initiators between which the difference in the temperature for the half-life of 10 hours is 5° C. or more. This allows the polymerization to be progressed efficiently.

The additive amount of the polymerization initiator is usually 0 to 1 part by weight with respect to 100 parts by weight of the total amount of the monomers added in all steps of the present invention. When the hydrostatic mixing reactor in which the liquid thermally-conductive medium flows through an internal coil is used, the polymerization reaction can be controlled by the temperature of the liquid medium rather than the polymerization initiator, the additive amount of the initiator can be reduced. Preferably, for the purpose of reducing the remaining polymerization initiator, the additive amount of the polymerization initiator is 0 to 0.1 parts by weight.

In addition, in the method for producing a thermoplastic copolymer of the present invention, for the purpose of adjusting the degree of polymerization in producing the copolymer (B), it is preferable to add a chain transfer agent such as an alkyl mercaptan, carbon tetrachloride, carbon tetrabromide, dimethylacetoamide, dimethylformamide, or triethylamine in an amount of 0.05 to 0.2 parts by weight with respect to 100 parts by weight of the total of the monomer (a) and the monomer (b). Alkyl mercaptans for use in the present invention include, for example, n-octyl mercaptan, t-dodecyl mercaptan, n-dodecyl mercaptan, n-tetradecyl mercaptan, and n-octadecyl mercaptan, and among these, particularly, n-octyl mercaptan, t-dodecyl mercaptan, or n-dodecyl mercaptan is preferably used as a chain transfer agent. In the case of using these chain transfer agents, the chain transfer agents can be used singly, or in combination of two or more of the chain transfer agents.

In the method for producing a thermoplastic copolymer of the present invention, known plasticizers, thermal stabilizers, antioxidants, light stabilizers, etc. may be added as required.

In the present invention, it is preferable to provide step (IV) of continuously volatilizing the reactant at a temperature of 100° C. or more and less than 300° C. with an atmospheric pressure (760 Torr) or less to separate an unreacted raw material mixture from the copolymer (B) and remove the unreacted raw material mixture.

The volatilizing temperature in step (IV) is preferably 100° C. or more and less than 300° C., and more preferably 120° C. or more and less than 280° C. The volatilizing at the volatilizing temperature of 100° C. or more and less than 300° C. removes adequately the unreacted monomer or the organic solvent which is the polymerization solvent, and does not cause thermal degradation, and as a result, improves the thermal stability and product quality of the obtained thermoplastic copolymer (B).

Further, a pressure in step (IV) is preferably an atmospheric pressure (760 Torr) or less, more preferably a reduced pressure of 200 Torr or less, furthermore preferably 100 Torr or less, and the most preferably 50 Torr or less. The lower limit of the pressure is preferably 0.1 Torr or more. If the pressure in the volatilizing step is 200 Torr or less, the unreacted monomer or the mixture of the unreacted monomer and the polymerization solvent can be efficiently separated and removed, and the thermal stability or quality of the obtained thermoplastic copolymer (B) is excellent.

The smaller amount of the remaining monomers after step (IV) is preferable from the viewpoint of thermal stability and product quality. That is, with respect to the amount of the remaining monomers, the aromatic vinyl monomer is preferably 1.0% or less, and more preferably 5000 ppm or less, the vinyl cyanide compound unit is preferably 5000 ppm or less, and more preferably 3000 ppm or less, and the organic solvent is preferably 1000 ppm or less, and more preferably 500 ppm or less.

As such a continuous volatilizing apparatus for carrying out volatilizing, there are a method of removing volatile components from a vent port at a normal pressure or a reduced pressure on heating with the use of a single screw or twin screw extruder with a vent, a method of removing volatile components with the use of an evaporator with, for example, a centrifugal-type plate-fin heater built in a drum, a method of removing volatile components with, for example, a centrifugal-type thin film evaporator, and a method of removing volatile components by flushing into a vacuum chamber through preheating and foaming with the use of a multitubular heat exchanger, etc., and any of these methods can be used. A preferable method is the method of removing volatile components by flushing into a vacuum chamber through preheating and foaming using a multitubular heat exchanger which is able to suppress, in particular, thermal decomposition of the copolymer and requires an inexpensive plant cost. The average residence time in the continuous volatilizing apparatus is preferably 5 to 60 minutes, and more preferably 10 to 45 minutes. It is also possible to use two or more continuous volatilizing apparatuses as described above within the range not impairing the objects of the present invention.

The unreacted monomer or the mixture of the unreacted monomer and the organic solvent, which is removed in step (IV), is preferably collected, and all recycled in the polymerization step. Since the volatile components are vaporized by heating under a reduced pressure in the volatilizing step, the volatile components are collected in their liquid states through a known cooling apparatus such as a still with a capacitor as the method for collecting the volatile components, thereby allowing the volatile components to be all recycled directly in the polymerization step. In addition, the volatile components collected in their liquid states can also be distilled and purified by use of a known distillation apparatus, and then recycled in the polymerization step as required.

The polymerized melt with the volatile components removed can be extruded into particles to obtain a pellet of the copolymer (B). Thus, the yellow color derived from acrylonitrile is improved in the obtained copolymer (B) and the pellet YI of the polymer (B) becomes preferably 20 or less.

With respect to the composition of the thermoplastic copolymer obtained in accordance with the method for producing a thermoplastic copolymer of the present invention, preferably, the aromatic vinyl compound is 50 to 70 weight % and the vinyl cyanide compound is 30 to 50 weight %, and more preferably, the aromatic vinyl compound is 45 to 65 weight % and the vinyl cyanide compound is 35 to 55 weight %.

The method for producing a thermoplastic copolymer of the present invention is characterized in that a composition distribution of vinyl cyanide of the resulting thermoplastic copolymer is broad and further the copolymer has haze of 5 or more and a total light transmittance of 80% or less. The proportion of a copolymer having the vinyl cyanide composition, which is higher by 2 weight % or more than an average vinyl cyanide content, is preferably 10 weight % or more, and more preferably 20 weight % or more. When the proportion of a copolymer having the vinyl cyanide composition, which is higher by 2 weight % or more than an average vinyl cyanide content, is 10 weight % or more, a thermoplastic resin composition which is superior in desired coating resistance can be obtained. Further, the proportion of a copolymer having the vinyl cyanide composition, which is higher by 2 weight % or more than an average vinyl cyanide content, is preferably less than 60 weight %, and more preferably less than 50 weight %.

The reduced viscosity of the thermoplastic copolymer obtained in accordance with the method for producing a thermoplastic copolymer of the present invention is preferably 0.45 to 0.65 dL/g from the viewpoint of the balance among physical properties in the case of using the copolymer as molded articles, and more preferably 0.50 to 0.60 dL/g.

Next, preferable examples of the polymerization method for the copolymer (B) with the use of the continuous polymerization line described above will be specifically described as an example with reference to a process diagram in FIG. 1. A loop reactor (i) illustrated in the process diagram in FIG. 1 is an example of the complete mixing flow reactor in step (I) for use in the present invention. A plug flow reactor (ii) illustrated in the process diagram in FIG. 1 is an example of the extrusion flow reactor in step (II) for use in the present invention.

A plunger pump (1) feeds raw material monomers, a radical initiator, and a solvent to a circulation-type loop reactor (i) including tubular reactors (2), (3) with a static mixing structure therein, and a gear pump (4). In the circulation-type loop reactor, polymerization is progressed while circulating the polymerization solution, and some of the polymerization solution is fed to the serial type plug flow reactor (ii). In this case, the ratio between the flow rate of the polymerization solution circulated in the loop reactor and the flow rate of the polymerization solution flowing out into the plug flow reactor, the reflux ratio (R=F1/F2) preferably falls within the range of 5 to 30, as described above, when the flow rate of a mixture solution refluxed in the loop reactor (i) not flowing out into the plug flow reactor (ii), is denoted by F1 (liter/time) whereas the flow rate of a mixture solution flowing out from the loop reactor (i) into the plug flow reactor (ii) is denoted by F2 (liter/time). Furthermore, the vinyl-based monomer mixture (b), and various organic solvents, polymerization initiators, chain transfer agents, antioxidants, and thermal3 stabilizers can be introduced from a side line (5) located in the connecting section from the loop reactor toward the plug flow reactor.

Next, the polymerization solution flowing out into the plug flow reactor (ii) passes though tubular reactors (6), (7) with a static mixing structure therein, thereby further progressing the polymerization. It is possible to have a composition distribution.

Then, the polymerization solution is fed to a preheater (8) and a volatilizing apparatus (9), in which the unreacted monomers, the solvent and the like are removed under a reduced pressure, and then discharged from a gear pump (10) and pelletized, thereby obtaining an intended copolymer composition (B).

The thermoplastic copolymer obtained in accordance with the method for producing a thermoplastic copolymer of the present invention is blended with other resins and extruded, and used as a coating-resistant thermoplastic resin composition. Examples of the resins to be blended include an AS resin, an ABS resin, vinyl chloride, polyolefins such as polyethylene and polypropylene, polyamides such as nylon 6 and nylon 66, polyesters such as polyethylene terephthalate, polybutylene terephthalate, and polycyclohexane-dimethyl terephthalate, polycarbonate, and various elastomers, and these can be blended in the thermoplastic copolymer of the present invention within the range not impairing the object of the present invention, and thereby performance as a resin for molding can be improved.

Further, in the coating-resistant thermoplastic resin composition, as required, the antioxidants such as hindered phenolic antioxidants, sulfur-containing organic compound-based antioxidants and phosphorus-containing organic compound-based antioxidants; the thermal stabilizers such as phenolic thermal stabilizers and acrylate-based thermal stabilizers; ultraviolet absorbers such as benzotriazole-based ultraviolet absorbers, benzophenone-based ultraviolet absorbers and salicylate-based ultraviolet absorbers; various stabilizers such as organic nickel-based photostabilizer and hindered amine-based photostabilizer; metal salts of higher fatty acids; lubricants such as higher fatty acid amides; plasticizers such as phthalic acid esters and phosphoric esters; halogen-containing compounds such as polybromodiphenyl ether, tetrabromobisphenol A, brominated epoxy oligomer and brominated polycarbonate oligomer; flame retardants/flame retardant aids such as phosphorus-based compounds and antimonous oxide; antistatic agents, carbon black, titanium oxide, pigments, and dyes can also be blended. Furthermore, reinforcing materials and fillers such as glass fibers, glass flakes, glass beads, carbon fibers and metal fibers can also be blended.

The coating-resistant thermoplastic resin composition thus obtained is suitably used in various applications such as car interior and exterior parts and home electric appliances, besides general merchandise. In addition, in the case of using the coating-resistant thermoplastic resin composition as a molded product, the molding method is not particularly limited, and specific examples of the molding method include injection molding, extrusion molding, blow molding, calendar molding, and transfer molding, and the injection molding is preferable from the standpoint of productivity.

EXAMPLES

In order to describe the method for producing a thermoplastic copolymer according to the present invention more specifically, examples will be given and described below. First, methods for analyzing resin characteristics of thermoplastic copolymers and coating-resistant thermoplastic resin compositions will be described below.

(1) The Degree of Polymerization

The concentration (weight %) was determined by gas chromatograph for unreacted monomers in a polymerization solution and in a charged raw material solution, and the degree of polymerization was calculated in accordance with the following formula.

Degree of Polymerization=$100 \times (1-M1/M0)$

Here, the respective symbols denote the following numerical values.

M1: Concentration of the unreacted monomer in the polymerization solution (weight %)

M0: Concentration of the monomer in the charged raw material solution (weight %)

(2) Polymer Generation Rate

The polymer generation rate was calculated in accordance with the following formula, assuming that the amounts of the reactive monomers (a) and (b) supplied are denoted by X1 (kg/h), the amount of the copolymer (B) discharged from the volatilizing apparatus is denoted by X2 (kg/h), and the total residence time of the polymerization solution in a complete mixing tank, tubular reactors, and a volatilizing apparatus is denoted by $\tau$(h).

Reaction Rate (%/h)=$(X2/X1)/\tau$ (3) Reduced Viscosity

Using an Ubbelohde viscosimeter, the viscosity was measured by a methyl ethyl ketone solution with a sample concentration of 0.4 g/dl at a measurement temperature of 30° C.

(4) Average Content of Vinyl Cyanide

A sample was formed into a film of about 40 μm in thickness by heat press and the content was measured by an infrared spectrophotometer.

(5) Composition Distribution of Vinyl Cyanide 2 g of the sample was dissolved in 80 ml of methyl ethyl ketone, and to this, cyclohexane was added and the resulting mixture was subjected to fractional precipitation to obtain a vinyl cyanide-based copolymer, and this copolymer was vacuum dried and its weight was measured. The vinyl cyanide content of the vinyl cyanide-based copolymer was determined from absorbance ratio of infrared spectroscopy. Then, the vinyl cyanide content-cumulative weight % was plotted, and the proportion (%) of a copolymer having the vinyl cyanide composition, which is higher by 2 weight % or more than an average vinyl cyanide content, was determined.

(6) Transparency of Thermoplastic Copolymer (Haze, Total Light Transmittance)

Pellets of a thermoplastic copolymer dried for 3 hours in a hot air drier of 80° C. were filled into a molding machine IS50A manufactured by TOSHIBA Corp., in which a cylinder temperature was set at 250° C., and molded quickly into a molded product of a rectangular plate (3 mm in thickness). Total light transmittance and haze value [%] were measured with a direct reading haze meter manufactured by Toyo Seiki Seisaku-sho, Ltd.

(6) Grafting Ratio

Acetone was added to a rubber-containing graft copolymer (I) (weight M) and the resulting mixture was refluxed for 3 hours. Thereafter, the resulting solution was centrifuged for 40 minutes, and an insoluble substance was separated by filtration and then vacuum-dried at 60° C. for 5 hours and its weight (N) was measured. A grafting ratio was calculated from the following equation. In the equation, L represents a content (%) of a rubber polymer in the rubber-containing graft copolymer (I).

Grafting ratio (%)=100×($M-N{\times}L/100$)/($M{\times}L/100$)

(7) Color of Thermoplastic Copolymer (YI Value)

After the coating-resistant thermoplastic resin composition was molded at 230° C., the resulting molded product was evaluated according to JIS K 7105 (1981), 6.3 Measuring method of yellowness index, yellowing index.

(8) Color Stability of Melted Resin (Yellowing Index (YI))

After the coating-resistant thermoplastic resin composition was retained at 230° C. for 30 minutes in the molding machine, the resulting molded product was evaluated according to JIS K 7105 (1981), 6.3 Measuring method of yellowness index, yellowing index.

(9) Izot Impact Test

The coating-resistant thermoplastic resin composition was injection-molded and Izot impact strength with ½-inch notch of the resulting molded product was measured according to ASTM D256.

(10) Coating Resistance

The coating-resistant thermoplastic resin composition was injection-molded and an acrylic coating material solution (coating material ACRYLINE #66E/thinner ACRYLINE I type thinner=50/50 by weight, manufactured by FUJIKURA KASEI Co., Ltd.) was applied to the resulting molded product by spraying and dried at 70° C. for 30 minutes. Thereafter, a surface property of a coated surface was visually evaluated. Further, in the case of a urethane-based coating material, Blush White (under coat: Pu Blush White Base, middle coat: Pu Blush White Cocktail #1, top coat: Pu Pearl Clear, curing agent: Polyuremightylac Hardener, thinner: Polyuremightylac) manufactured by NIPPONPAINT Co., Ltd. was applied and dried at 70° C. for 30 minutes. Thereafter, the coat adhesion of the coated surface was evaluated.

(11) Fluidity

A melt flow rate of the coating-resistant thermoplastic resin composition was measured at 220° C. and at a load of 10 kg according to ISO 1133.

(12) Bleeding

The coating-resistant thermoplastic resin composition pellet of 15 g was dried at 80° C. for 3 hours, and then placed on a hot plate at 270° C. provided underneath. Spacers were used to make an adjustment so that the gap of an upper plate was 4 mm, and the upper plate was removed after heating for 10 minutes. The bleed adhering to the upper plate was weighed to determine the bleeding (weight %) contained in 15 g of the sample.

Reference Example 1

Preparation of Rubber-Containing Graft Copolymer (I)

50 parts (solid content basis) of polybutadiene latex (rubber particle diameter 0.3 μm, gel content 85%), 180 parts of pure water, 0.4 parts of sodium formaldehyde sulfoxylate, 0.1 parts of sodium ethylenediaminetetraacetate, 0.01 parts of ferrous sulfate and 0.1 parts of sodium phosphate were charged into a reaction container and the inside of the container was replaced with nitrogen. Thereafter, a system was adjusted to 65° C., and to the mixture, a mixture of 38.5 parts of styrene, 11.5 parts of acrylonitrile, 0.05 parts of 2-[2-hydroxy-5'-(methacryloyloxymethyl)phenyl]-2H-benzo triazole (hereinafter, abbreviated to benzotriazole (A)) and 0.3 parts of n-dodecyl mercaptan was added dropwise over 4 hours while stirring. In parallel with this, a mixture of 0.25 parts of cumene hydroperoxide, 2.5 parts of sodium oleate of emulsifier and 25 parts of pure water was continuously added dropwise over 5 hours, and after the dropwise addition, the mixture was held for further one hour to complete the graft copolymerization.

The latex-like product obtained after the completion of the graft copolymerization was poured into 2000 parts of hot water of 95° C. including 1.0 parts of sulfuric acid added while stirring to be coagulated. Next, the mixture was neutralized with 0.8 parts of sodium hydroxide to obtain a coagulated slurry. After the slurry was separated by centrifugation, it was washed for 5 minutes in 2000 parts of water of 40° C. and separated by centrifugation, and dried for 12 hours in a hot air drier of 60° C. to prepare a powdery graft copolymer (I) (grafting ratio 35%).

Reference Example 2

Preparation of Styrene-Based Thermoplastic Resin

Using a continuous bulk polymerization apparatus composed of a complete mixing tank of stainless autoclave provided with a double-helical stirring impeller, a pre-heater and a de-monomer machine, a monomer mixture consisting of 28 parts of acrylonitrile, 72 parts of styrene and 0.18 parts of n-octyl mercaptan was continuously supplied to a polymerization tank at a rate of 135 kg/h to perform continuous bulk polymerization. The degree of polymerization of a polymer at the outlet of the polymerization tank was controlled between 74% and 76%, and a polymerization reaction mixture was preheated in a single-screw extruder type preheater and then sent to a twin-screw extruder type de-monomer machine and an unreacted monomer was recovered from a vent through evaporation under a reduced pressure to obtain a styrene thermoplastic resin (II) from a front end of the de-monomer machine. The average vinyl cyanide content of the obtained styrene-based copolymer (II) is 28% and the proportion (%) of a copolymer having the vinyl cyanide composition, which is higher by 2 weight % or more than an average vinyl cyanide content, was 0%.

Example 1

Continuous Solution Polymerization

A monomer mixture according to the following formula was supplied continuously from the plunger pump (1) at a rate of 5.75 kg/h using the continuous polymerization apparatus shown in FIG. 1. The circulation-type loop reactor (i), which is a complete mixing flow reactor, is composed of tubular reactors with an internal diameter of 2.5 inches (SMX-type static mixer with 30 static mixing elements built therein and with a heat transfer area 130 m$^2$/m$^3$, manufactured by Gebruder Sulzer in Switzerland) (2), (3) and of a gear pump (4) for circulating a mixed solution. The reflux ratio (R=F1/F2) was 20. Continuous polymerization was carried out with the polymerization temperature in the loop reactor (i): 110° C.; the inner wall temperature of the reactors (2), (3): 115° C.; and the average residence time: 1 hour. The degree of polymerization was 70%.

| | |
|---|---|
| Acrylonitrile | 40.0 weight % |
| Styrene | 60.0 weight % |
| (hereinafter, with respect to 100 parts by weight of the total amount of the monomers added in all steps) | |
| Methyl ethyl ketone | 15.0 parts by weight |
| 1,1'-bis(t-butylperoxy)cyclohexane | 0.005 parts by weight |
| n-octylmercaptan | 0.20 parts by weight |

The serial type plug flow reactor (ii), which is an extrusion flow reactor, was composed of tubular reactors (6), (7) with an internal diameter of 2.5 inches, and the inner wall temperatures of the tubular reactors (6), (7) were 130° C., the polymerization temperature was 130° C., and the residence time was 30 minutes. The degree of polymerization of the polymerization solution at the outlet of the tubular reactor (7) was 80%.

Subsequently, the polymerization solution was supplied to the heat exchanger (8) and volatilizing tank (9) heated to 260° C., in which a volatilizing reaction was performed at a pressure of 20 Torr for 30 minutes to prepare a thermoplastic copolymer (B-1) in the shape of a pellet. The amount of the obtained polymer was 4.0 kg/h, the total residence time was 3 hours and the polymer generation rate was 27%/h.

The reduced viscosity of the copolymer (B-1) was 0.548 dL/g, and the haze and the total light transmittance were 13 and 76%, respectively.

In the composition distribution of the copolymer (B), the proportion of a copolymer having the vinyl cyanide composition, which is higher by 2 weight % or more than an average vinyl cyanide content of the copolymer (B), was 20%.

The rubber-containing graft copolymer (I) obtained in Reference Example 1, the styrene-based copolymer (II) obtained in Reference Example 2, the copolymer (B-1) obtained in Example 1 and ethylene bis-stearyl amide (manufactured by KAO Corp., trade name PSEA) were mixed with a Henschel mixer in the proportion described below and the resulting mixture was melt-kneaded with a 40 mmφ single-screw extruder to obtain a coating-resistant thermoplastic resin composition.

| | |
|---|---|
| Graft copolymer (I) | 30.0 weight % |
| Styrene-based copolymer (II) | 50.0 weight % |
| Copolymer (B-1) | 20.0 weight % |
| Ethylene bis-stearyl amide | 2.2 parts by weight |

Example 2

Continuous Solution Polymerization

A monomer mixture according to the following formula was supplied continuously at a rate of 5.75 kg/h and the continuous polymerization was carried out in the same manner as in Example 1. The degree of polymerization at the outlet of the loop reactor was 50%, the reaction temperature at the outlet of the plug flow reactor was 140° C., and the degree of polymerization was 75%. The amount of the obtained polymer was 3.75 kg/h. The reduced viscosity of the copolymer (B-2) was 0.561 dL/g. The haze and the total light transmittance were 13 and 76%, respectively.

| | |
|---|---|
| Acrylonitrile | 45.0 weight % |
| Styrene | 55.0 weight % |
| (hereinafter, with respect to 100 parts by weight of the total amount of the monomers added in all steps) | |
| Methyl ethyl ketone | 15.0 parts by weight |
| 1,1'-bis(t-butylperoxy)cyclohexane | 0.008 parts by weight |
| n-octylmercaptan | 0.20 parts by weight |

Using the obtained copolymer (B-2), a mixture was extruded in the same manner as in Example 1 to prepare a coating-resistant thermoplastic resin composition.

Example 3

Continuous Solution Polymerization

A monomer mixture according to the following formula was supplied continuously at a rate of 3.25 kg/h and the continuous polymerization was carried out in the same manner as in Example 1. The polymerization temperature in the loop reactor was 100° C. and the degree of polymerization was 70%.

| | |
|---|---|
| Acrylonitrile | 40.0 weight % |
| Styrene | 15.0 weight % |
| (hereinafter, with respect to 100 parts by weight of the total amount of the monomers added in all steps) | |
| Methyl ethyl ketone | 10.0 parts by weight |
| 1,1'-bis(t-butylperoxy)cyclohexane | 0.010 parts by weight |
| n-octylmercaptan | 0.20 parts by weight |

The polymerization solution obtained in the previous polymerization step was continuously drawn off at a rate of 3.5 kg/h, and supplied continuously to a plug flow reactor together with the following monomer mixture (2.5 kg/h).

| | |
|---|---|
| Styrene | 45.0 weight % |
| (hereinafter, with respect to 100 parts by weight of the total amount of the monomers added in all steps) | |
| Methyl ethyl ketone | 5.0 parts by weight |

The inner wall temperatures of the tubular reactors were 140° C. and the degree of polymerization at the outlet was 75%. The volatilizing reaction was similar to that in Example 1. The reduced viscosity of the copolymer (B-3) was 0.544 dL/g. The haze and the total light transmittance were 18 and 68%, respectively.

Using the obtained copolymer (B-3), a mixture was extruded in the same manner as in Example 1 to prepare a coating-resistant thermoplastic resin composition.

Example 4

Continuous Solution Polymerization

A monomer mixture according to the following formula was supplied continuously to a loop reactor at a rate of 4.0 kg/h and the continuous polymerization was carried out in the same manner as in Example 1. The polymerization temperature in the loop reactor was 110° C. and the degree of polymerization was 70%.

| | |
|---|---|
| Acrylonitrile | 40.0 weight % |
| Styrene | 30.0 weight % |
| (hereinafter, with respect to 100 parts by weight of the total amount of the monomers added in all steps) | |
| Methyl ethyl ketone | 10.0 parts by weight |
| 1,1'-bis(t-butylperoxy)cyclohexane | 0.008 parts by weight |
| n-octylmercaptan | 0.20 parts by weight |

The polymerization solution obtained in the previous polymerization step was continuously drawn off at a rate of 4.0 kg/h, and supplied continuously to a plug flow reactor together with the following monomer mixture (1.75 kg/h).

| | |
|---|---|
| Styrene | 30.0 weight % |
| (hereinafter, with respect to 100 parts by weight of the total amount of the monomers added in all steps) | |
| Methyl ethyl ketone | 5.0 parts by weight |
| 1,1'-bis(t-butylperoxy)cyclohexane | 0.003 parts by weight |

The inner wall temperature of the plug flow reactor was 130° C. and the degree of polymerization at the outlet was 80%. The volatilizing reaction was similar to that in Example 1. The reduced viscosity of the copolymer (B-4) was 0.552 dL/g. The haze and the total light transmittance were 17 and 69%, respectively.

Using the obtained copolymer (B-4), a mixture was extruded in the same manner as in Example 1 to prepare a coating-resistant thermoplastic resin composition.

Example 5

Continuous Solution Polymerization

A monomer mixture according to the following formula was supplied continuously to a loop reactor at a rate of 5.0 kg/h and the continuous polymerization was carried out in the same manner as in Example 1.

| | |
|---|---|
| Acrylonitrile | 40.0 weight % |
| Styrene | 50.0 weight % |
| (hereinafter, with respect to 100 parts by weight of the total amount of the monomers added in all steps) | |
| Methyl ethyl ketone | 10.0 parts by weight |
| 1,1'-bis(t-butylperoxy)cyclohexane | 0.012 parts by weight |
| n-octylmercaptan | 0.20 parts by weight |

The polymerization temperature in the loop reactor was 110° C. and the degree of polymerization was 60%. The polymerization solution obtained in the previous polymerization step was continuously drawn off at a rate of 4.0 kg/h, and supplied continuously to a plug flow reactor together with the following monomer mixture (0.75 kg/h).

| | |
|---|---|
| Styrene | 10.0 weight % |
| (hereinafter, with respect to 100 parts by weight of the total amount of the monomers added in all steps) | |
| Methyl ethyl ketone | 5.0 parts by weight |
| 1,1'-bis(t-butylperoxy)cyclohexane | 0.0015 parts by weight |

The inner wall temperature of the plug flow reactor was 140° C. and the degree of polymerization at the outlet was 75%. The volatilizing reaction was similar to that in Example 1. The reduced viscosity of the copolymer (B-5) was 0.571 dL/g. The haze and the total light transmittance were 15 and 72%, respectively.

Using the obtained copolymer (B-5), a mixture was extruded in the same manner as in Example 1 to prepare a coating-resistant thermoplastic resin composition.

Example 6

Continuous Solution Polymerization

A monomer mixture according to the following formula was supplied continuously to a loop reactor at a rate of 5.0 kg/h and the continuous polymerization was carried out in the same manner as in Example 1. The polymerization temperature in the loop reactor was 110° C. and the degree of polymerization was 55%.

| | |
|---|---|
| Acrylonitrile | 40.0 weight % |
| Styrene | 50.0 weight % |
| (hereinafter, with respect to 100 parts by weight of the total amount of the monomers added in all steps) | |
| Methyl ethyl ketone | 10.0 parts by weight |
| 1,1'-bis(t-butylperoxy)cyclohexane | 0.013 parts by weight |
| n-octylmercaptan | 0.20 parts by weight |

The polymerization solution obtained in the previous polymerization step was continuously drawn off at a rate of 4.0 kg/h, and supplied continuously to a plug flow reactor together with the following monomer mixture (0.75 kg/h).

| | |
|---|---|
| Styrene | 5.0 weight % |
| Acrylonitrile | 5.0 weight % |
| (hereinafter, with respect to 100 parts by weight of the total amount of the monomers added in all steps) | |

| | |
|---|---|
| Methyl ethyl ketone | 5.0 parts by weight |
| 1,1'-bis(t-butylperoxy)cyclohexane | 0.0015 parts by weight |

The inner wall temperature of the plug flow reactor was 140° C. and the degree of polymerization at the outlet was 72%. The volatilizing reaction was similar to that in Example 1. The reduced viscosity of the copolymer (B-6) was 0.545 dL/g. The haze and the total light transmittance were 15 and 73%, respectively.

Using the obtained copolymer (B-6), a mixture was extruded in the same manner as in Example 1 to prepare a coating-resistant thermoplastic resin composition.

Example 7

Continuous Solution Polymerization

A monomer mixture according to the following formula was supplied continuously at a rate of 5 kg/h and the continuous polymerization was carried out in the same manner as in Example 1. The polymerization temperature in the loop reactor was 110° C., the average residence time was 1 hour and the degree of polymerization was 60%. The inner wall temperature of the plug flow reactor was 130° C., the average residence time was 30 minutes and the degree of polymerization was 80%.

| | |
|---|---|
| Acrylonitrile | 40.0 weight % |
| Styrene | 60.0 weight % |
| (hereinafter, with respect to 100 parts by weight of the total amount of the monomers added in all steps) | |
| 1,1'-bis(t-butylperoxy)cyclohexane | 0.005 parts by weight |
| n-octylmercaptan | 0.20 parts by weight |

Subsequently, a volatilizing reaction was performed to prepare a thermoplastic copolymer (A-5) in the shape of a pellet. The amount of the obtained polymer was 4.2 kg/h and total residence time was 2 hours. The reduced viscosity of the copolymer (B-7) was 0.592 dL/g. The haze and the total light transmittance were 12 and 77%, respectively.

Using the obtained copolymer (B-7), a mixture was extruded in the same manner as in Example 1 to prepare a coating-resistant thermoplastic resin composition.

Example 8

Continuous Bulk Polymerization+Solution Polymerization

A monomer mixture according to the following formula was supplied continuously to a loop reactor at a rate of 4.5 kg/h and the continuous polymerization was carried out in the same manner as in Example 1. The polymerization temperature in the loop reactor was 110° C., the average residence time was 1.5 hours and the degree of polymerization was 60%.

| | |
|---|---|
| Acrylonitrile | 40.0 weight % |
| Styrene | 50.0 weight % |
| (hereinafter, with respect to 100 parts by weight of the total amount of the monomers added in all steps) | |
| 1,1'-bis(t-butylperoxy)cyclohexane | 0.005 parts by weight |
| n-octylmercaptan | 0.20 parts by weight |

The polymerization solution obtained in the previous polymerization step was continuously drawn off at a rate of 4.0 kg/h, and supplied continuously to a plug flow reactor together with the following monomer mixture at a rate of 0.75 kg/h.

| | |
|---|---|
| Styrene | 5.0 weight % |
| Acrylonitrile | 5.0 weight % |
| (hereinafter, with respect to 100 parts by weight of the total amount of the monomers added in all steps) | |
| Methyl ethyl ketone | 5.0 parts by weight |

The inner wall temperature of the plug flow reactor was 130° C., the average residence time was 30 minutes and the degree of polymerization at the outlet was 80%. The volatilizing reaction was developed in the same manner as in Example 1. The reduced viscosity of the copolymer (B-8) was 0.548 dL/g. The haze and the total light transmittance were 13 and 76%, respectively.

Using the obtained copolymer (B-8), a mixture was extruded in the same manner as in Example 1 to prepare a coating-resistant thermoplastic resin composition.

Example 9

Continuous Solution Polymerization

Continuous polymerization was carried out under the same conditions as in Example 1 except that the polymerization solution was supplied to a volatilizing tank heated to 260° C. to perform a volatilizing reaction at a pressure of 250 Torr for 120minutes. The obtained pellet exhibited a yellow color because the copolymer experienced a large thermal history due to a prolonged residence in a volatilizing can. The reduced viscosity of the copolymer (B-9) was 0.548 L/g. The haze and the total light transmittance were 13 and 76%, respectively. Using the obtained copolymer (B-9), a mixture was extruded in the same manner as in Example 1 to prepare a coating-resistant thermoplastic resin composition.

Example 10

Continuous Solution Polymerization

Continuous polymerization was carried out under the same conditions as in Example 1 except for changing the amount of methyl ethyl ketone to 50 parts by weight. The average residence time in the loop reactor was 2 hours and the degree of polymerization was 30 weight %.

The inner wall temperature of the plug flow reactor was 130° C., the average residence time was 30 minutes and the degree of polymerization was 40%. The volatilizing reaction was performed to prepare a thermoplastic copolymer (A-7) in the shape of a pellet. The amount of the obtained polymer was 2.0 kg/h and total residence time was 3 hours. The reduced viscosity of the copolymer (B-10) was 0.548 L/g. The haze and the total light transmittance were 13 and 76%, respectively.

Using the obtained copolymer (B-10), a mixture was extruded in the same manner as in Example 1 to prepare a coating-resistant thermoplastic resin composition.

Comparative Example 1

Continuous Solution Polymerization

Continuous polymerization was carried out by continuously supplying a monomer mixture with the following formula, bubbled with a nitrogen gas of 20 L/minute for 15 minutes, to a 20 liter stainless autoclave provided with a double-helical stirring impeller at a rate of 5 kg/h, stirring at 50 rpm and controlling the internal temperature to 110° C. with an average residence time of 2 hours. The degree of polymerization was 60%. The autoclave is a complete mixing reactor.

| | |
|---|---|
| Acrylonitrile | 40.0 weight % |
| Styrene | 60.0 weight % |
| (hereinafter, with respect to 100 parts by weight of the total amount of the monomers added in all steps) | |
| Methyl ethyl ketone | 15.0 parts by weight |
| 1,1'-bis(t-butylperoxy)cyclohexane | 0.005 parts by weight |
| n-octylmercaptan | 0.20 parts by weight |

Subsequently, the polymerization solution was supplied to the volatilizing tank heated to 260° C., in which a volatilizing reaction was performed at a pressure of 20 Torr for 30 minutes to prepare a thermoplastic copolymer (B-11) in the shape of a pellet. The reduced viscosity of the copolymer (B-11) was 0.520 dL/g. The haze and the total light transmittance were 7 and 83%, respectively.

Using the obtained copolymer (B-11), a mixture was extruded in the same manner as in Example 1 to prepare a coating-resistant thermoplastic resin composition.

Comparative Example 2

Continuous Solution Polymerization

Continuous polymerization was carried out by continuously supplying a monomer mixture with the following formula, bubbled with a nitrogen gas of 20 L/minute for 15 minutes, to a 20 liter stainless autoclave provided with a double-helical stirring impeller at a rate of 5 kg/h, stirring at 50 rpm and controlling the internal temperature to 110° C. with an average residence time of 2 hours.

| | |
|---|---|
| Acrylonitrile | 40.0 weight % |
| Styrene | 60.0 weight % |
| (hereinafter, with respect to 100 parts by weight of the total amount of the monomers added in all steps) | |
| Methyl ethyl ketone | 15.0 parts by weight |
| 1,1'-bis(t-butylperoxy)cyclohexane | 0.005 parts by weight |
| n-octylmercaptan | 0.20 parts by weight |

The degree of polymerization was 60%. Subsequently, a polymerization solution was supplied continuously to a 20 liter stainless autoclave provided with a double-helical stirring impeller. The stainless autoclave provided with a double-helical stirring impeller is a complete mixing type reactor.

Continuous polymerization was carried out by stirring at 50 rpm and controlling the internal temperature to 130° C. with an average residence time of 1 hour. The degree of polymerization was 75%, and subsequently, the polymerization solution was supplied to the volatilizing tank heated to 260° C., in which a volatilizing reaction was performed at a pressure of 20 Torr for 30 minutes to prepare a thermoplastic copolymer (B-12) in the shape of a pellet. The reduced viscosity of the copolymer (B-12) was 0.513 dL/g. The haze and the total light transmittance were 9 and 80%, respectively.

Using the obtained copolymer (B-12), a mixture was extruded in the same manner as in Example 1 to prepare a coating-resistant thermoplastic resin composition.

Comparative Example 3

Continuous Solution Polymerization

A monomer mixture with the following formula, bubbled with a nitrogen gas of 20 L/minute for 15 minutes, was continuously supplied to a 20 liter stainless autoclave provided with a double-helical stirring wing at a rate of 3.25 kg/h and the continuous polymerization was carried out in the same manner as in Example 3. The degree of polymerization in a complete mixing type reactor was 70%.

| | |
|---|---|
| Acrylonitrile | 40.0 weight % |
| Styrene | 15.0 weight % |
| (hereinafter, with respect to 100 parts by weight of the total amount of the monomers added in all steps) | |
| Methyl ethyl ketone | 10.0 parts by weight |
| 1,1'-bis(t-butylperoxy)cyclohexane | 0.010 parts by weight |
| n-octylmercaptan | 0.20 parts by weight |

The polymerization solution obtained in the previous polymerization step was continuously drawn off at a rate of 3.25 kg/h, and continuously supplied to a 20 liter stainless autoclave provided with a double-helical stirring impeller together with the following monomer mixture at a rate of 2.5 kg/h. The stainless autoclave provided with a double-helical stirring impeller is a complete mixing type reactor.

| | |
|---|---|
| Styrene | 45.0 weight % |
| (hereinafter, with respect to 100 parts by weight of the total amount of the monomers added in all steps) | |
| Methyl ethyl ketone | 5.0 parts by weight |

Continuous polymerization was carried out by stirring at 50 rpm and controlling the internal temperature to 130° C. with an average residence time of 1 hour. The degree of polymerization was 75%, and subsequently, the polymerization solution was supplied to the volatilizing tank heated to 260° C., in which a volatilizing reaction was performed at a pressure of 20 Torr for 30 minutes to prepare a thermoplastic copolymer (B-13) in the shape of a pellet. The reduced viscosity of the copolymer (B-13) was 0.521 L/g. The haze and the total light transmittance were 9 and 80%, respectively.

Using the obtained copolymer (B-13), a mixture was extruded in the same manner as in Example 1 to prepare a coating-resistant thermoplastic resin composition.

Comparative Example 4

Suspension Polymerization

In a 20 liter stainless autoclave provided with a baffle and a Pfaudler type stirring impeller, a solution obtained by dissolving 0.05 parts of methylmethacrylate-acrylamide copolymer (described in Japanese Examined Patent Publication No. 45-24151) in 165 parts of ion-exchange water was stirred at 400 rpm and the inside of a system was replaced with a nitrogen gas. Next, a mixed solution of 31 parts of acrylonitrile, 69 parts of styrene, 0.3 parts of t-dodecylmercaptan and 0.52 parts of 2,2'-azobisisobutylonitrile was added while stirring a reaction system and the resulting mixture was heated to 60° C. to initiate polymerization. The mixture was heated to 65° C. before a lapse of 100 minutes from the initiation of the polymerization and then heated to 100° C. over 50 minutes to complete the polymerization. Since then, according to a common method, the reaction system was cooled and the polymer was separated, washed and dried to obtain a vinyl cyanide-based copolymer (B-14). The reduced viscosity of the copolymer (B-14) was 0.548 L/g. The haze and the total light transmittance were 15 and 73%, respectively. Using the obtained copolymer (B-14), a mixture was extruded in the same manner as in Example 1 to prepare a coating-resistant thermoplastic resin composition.

The methods for producing the copolymers (B-1) to (B-14) obtained in Examples 1 to 10 and Comparative Examples 1 to 4 are shown in Table 1, and the reduced viscosities and results of the composition distribution of the copolymers (B-1) to (B-14), and YI values, amounts of bleeding, Izod impact strengths, coating resistances and melt flow rates of the coating-resistant thermoplastic resin composition pellets obtained by mixing/extrusion were measured and shown in Table 2.

TABLE 1

| | | Complete Mixing Flow Reactor | | | | | | |
|---|---|---|---|---|---|---|---|---|
| | | Composition of Charged Monomer (wt %) | | Solvent | Radical Polymerization Initiator | Chain Transfer Agent | Polymerization Temperature | Residence Time | Degree of Polymerization |
| | Polymerization Method | ST | AN | (part by wt) | (part by wt) | (part by wt) | (° C.) | (h) | (%) |
| Example 1 | Solution Polymerization | 60 | 40 | MEK 15 | 0.005 | 0.2 | 110 | 2.0 | 60 |
| Example 2 | Solution Polymerization | 55 | 45 | MEK 15 | 0.008 | 0.2 | 110 | 2.0 | 50 |
| Example 3 | Solution Polymerization | 15 | 40 | MEK 10 | 0.01 | 0.2 | 100 | 2.5 | 70 |
| Example 4 | Solution Polymerization | 30 | 40 | MEK 10 | 0.008 | 0.2 | 110 | 2.5 | 70 |
| Example 5 | Solution Polymerization | 50 | 40 | MEK 10 | 0.012 | 0.2 | 110 | 2.0 | 60 |
| Example 6 | Solution Polymerization | 50 | 40 | MEK 10 | 0.0013 | 0.2 | 110 | 2.0 | 55 |
| Example 7 | Bulk Polymerization | 60 | 40 | — | 0.005 | 0.2 | 110 | 1.0 | 60 |
| Example 8 | Bulk Polymerization + Solution Polymerization | 50 | 40 | — | 0.005 | 0.2 | 110 | 1.5 | 60 |
| Example 9 | Solution Polymerization | 60 | 40 | MEK 15 | 0.005 | 0.2 | 110 | 2.0 | 60 |
| Example 10 | Solution Polymerization | 60 | 40 | MEK 50 | 0.005 | 0.2 | 110 | 2.0 | 30 |
| Comparative Example 1 | Solution Polymerization | 60 | 40 | MEK 15 | 0.005 | 0.2 | 110 | 2.0 | 60 |
| Comparative Example 2 | Solution Polymerization | 60 | 40 | MEK 15 | 0.005 | 0.2 | 110 | 2.0 | 60 |
| Comparative Example 3 | Solution Polymerization | 15 | 40 | MEK 10 | 0.01 | 0.2 | 100 | 2.5 | 70 |
| Comparative Example 4 | Suspension Polymerization | 60 | 40 | Water* 165 | ABNV 0.52 | TDM 0.3 | 60→65→100 | 2.5 | 95 |

| | Extrusion Flow Reactor | | | | | | |
|---|---|---|---|---|---|---|---|
| | Composition of Charged Monomer (wt %) | | Solvent | Radical Polymerization Initiator | Polymerization Temperature | Residence Time | Degree of Polymerization |
| | ST | AN | (part by wt) | (part by wt) | (° C.) | (h) | (%) |
| Example 1 | — | — | — | — | 130 | 0.5 | 80 |
| Example 2 | — | — | — | — | 140 | 0.5 | 75 |
| Example 3 | 45 | — | MEK 5 | — | 140 | 0.5 | 40 |
| Example 4 | 30 | — | MEK 5 | 0.003 | 130 | 0.5 | 50 |
| Example 5 | 10 | — | MEK 5 | 0.0015 | 130 | 0.5 | 60 |
| Example 6 | 5 | 5 | MEK 5 | 0.0015 | 130 | 0.5 | 80 |
| Example 7 | — | — | — | — | 130 | 0.5 | 85 |
| Example 8 | 5 | 5 | MEK 5 | — | 130 | 0.5 | 80 |

TABLE 1-continued

| | | | | | | | |
|---|---|---|---|---|---|---|---|
| Example 9 | — | — | — | — | 130 | 0.5 | 80 |
| Example 10 | — | — | — | — | 130 | 0.5 | 40 |
| Comparative Example 1 | — | — | — | — | not used | | |
| Comparative Example 2 | | | complete mixing flow(complete mixing tank) | | 130 | 1.0 | 75 |
| Comparative Example 3 | 45 | — | MEK 5 | complete mixing flow(complete mixing tank) | 130 | 1.0 | 75 |
| Comparative Example 4 | — | — | — | — | not used | | |

| | Volatilizing Apparatus | | | Total Residence Time (h) | Polymer Generation rate (%/h) | Type of Copolymer |
|---|---|---|---|---|---|---|
| | Volatilizing Temperature (°C.) | Vacuum (Torr) | Residence Time (h) | | | |
| Example 1 | 260 | 20 | 0.5 | 3.0 | 27 | B-1 |
| Example 2 | 260 | 20 | 0.5 | 3.0 | 25 | B-2 |
| Example 3 | 260 | 20 | 0.5 | 3.5 | 11 | B-3 |
| Example 4 | 260 | 20 | 0.5 | 3.5 | 14 | B-4 |
| Example 5 | 260 | 20 | 0.5 | 3.0 | 22 | B-5 |
| Example 6 | 260 | 20 | 0.5 | 3 | 27 | B-6 |
| Example 7 | 260 | 20 | 0.5 | 2.0 | 40 | B-7 |
| Example 8 | 260 | 20 | 0.5 | 2.5 | 32 | B-8 |
| Example 9 | 260 | 20 | 2.0 | 4.5 | 18 | B-9 |
| Example 10 | 260 | 20 | 0.5 | 3.0 | 13 | B-10 |
| Comparative Example 1 | 260 | 20 | 0.5 | 2.5 | 24 | B-11 |
| Comparative Example 2 | 260 | 20 | 0.5 | 3.5 | 20 | B-12 |
| Comparative Example 3 | 260 | 20 | 0.5 | 4.0 | 19 | B-13 |
| Comparative Example 4 | not used | | | — | | B-14 |

ST: styrene
AN: acrylonitrile
MEK: methyl ethyl ketone
Water*: 0.05 parts of methyl methacrylate-acrylamide copolymer in ion-exchange water
ABNV: 2,2'-azobisisobutylonitrile
TDM: t-dodecyl mercaptan

TABLE 2

Results of evaluation of thermoplastic copolymer

| | | Styrene-Based Polymer | | | | | |
|---|---|---|---|---|---|---|---|
| | | Average Polymer Composition | | Proportion of copolymer having higher vinyl cyanide by 2 wt % or more than average vinyl cyanide content % | Transparency | | Reduced Viscosity ηsP/c dl/g |
| | Type of Copolymer (B) | Styrene (ST) Unit % | Acrylonitrile (AN) Unit % | | Haze | Total Light Transmittance (Tt) % | Color (YI value) | |
| Example 1 | (B-1) | 65 | 35 | 20 | 9 | 76 | 15 | 0.548 |
| Example 2 | (B-2) | 60 | 40 | 22 | 8 | 76 | 17 | 0.561 |
| Example 3 | (B-3) | 66 | 34 | 50 | 18 | 68 | 17 | 0.544 |
| Example 4 | (B-4) | 65 | 35 | 46 | 17 | 69 | 16 | 0.552 |
| Example 5 | (B-5) | 64 | 36 | 35 | 15 | 72 | 15 | 0.571 |
| Example 6 | (B-6) | 60 | 40 | 30 | 13 | 73 | 14 | 0.545 |
| Example 7 | (B-7) | 66 | 34 | 18 | 7 | 77 | 12 | 0.592 |
| Example 8 | (B-8) | 59 | 41 | 32 | 13 | 76 | 16 | 0.548 |
| Example 9 | (B-9) | 63 | 37 | 23 | 9 | 76 | 20 | 0.54 |
| Example 10 | (B-10) | 69 | 31 | 22 | 8 | 76 | 11 | 0.51 |
| Comparative Example 1 | (B-11) | 70 | 30 | 0 | 2 | 83 | 13 | 0.52 |
| Comparative Example 2 | (B-12) | 65 | 35 | 3 | 4 | 80 | 15 | 0.513 |
| Comparative Example 3 | (B-13) | 68 | 32 | 6 | 6 | 80 | 19 | 0.521 |
| Comparative Example 4 | (B-14) | 65 | 35 | 30 | 13 | 73 | 22 | 0.548 |

TABLE 2-continued

Results of evaluation of thermoplastic copolymer

|  | Thermal Stability (yellowing YI value) | Izot Impact Strength J/m | MFR g/10 min | Bleeding wt % | Coating Resistance | |
| --- | --- | --- | --- | --- | --- | --- |
|  |  |  |  |  | Acryl Coating Material *1 | Urethane Coating Material *2 |
| Example 1 | 20 | 310 | 17 | 0.02 | ○ | ○ |
| Example 2 | 21 | 290 | 15 | 0.03 | ○ | ○ |
| Example 3 | 26 | 320 | 17 | 0.04 | ○ | ○ |
| Example 4 | 25 | 310 | 15 | 0.03 | ○ | ○ |
| Example 5 | 22 | 290 | 16 | 0.03 | ○ | ○ |
| Example 6 | 23 | 320 | 13 | 0.05 | ○ | ○ |
| Example 7 | 19 | 340 | 12 | 0.02 | ○ | ○ |
| Example 8 | 20 | 310 | 16 | 0.04 | ○ | ○ |
| Example 9 | 30 | 310 | 17 | 0.04 | ○ | ○ |
| Example 10 | 15 | 350 | 20 | 0.07 | ○ | ○ |
| Comparative Example 1 | 15 | 290 | 17 | 0.06 | x | x |
| Comparative Example 2 | 18 | 280 | 13.0 | 0.08 | x | x |
| Comparative Example 3 | 22 | 280 | 13.0 | 0.08 | x | x |
| Comparative Example 4 | 32 | 260 | 12.0 | 0.15 | ○ | ○ |

*1 ○: no absorption, x: occurrence of absorption
*2 ○: no peeling, x: occurrence of peeling As is apparent from the results of Examples 1 to 10, the thermoplastic copolymers prepared in accordance with the method for producing a thermoplastic copolymer of the present invention provide excellent production efficiencies, solve the operational problems, have a wide composition distribution of vinyl cyanide, and are superior in all of color (YI value), thermal stability (YI value in yellowing), Izod impact strength, fluidity (a melt flow rate), mold staining of a molding machine (bleeding), and coating resistance. In particular, the thermoplastic resin compositions obtained by the production methods of a thermoplastic resin composition in Examples 1 to 6 provide excellent production efficiencies, and exhibit wide composition distributions.

On the other hand, Comparative Example 1 does not have an extrusion flow reactor. Its composition distribution was extremely narrow and inferior in coating resistance and impact strength.

In Comparative Examples 2 and 3, though the polymerization was performed by use of the complete mixing flow reactor in place of the extrusion flow reactor, the coating resistance and the impact strength were low.

In Comparative Example 4, the production method based on suspension polymerization was employed and the thermoplastic copolymer has a vinyl cyanide composition distribution, mechanical properties and coating resistance other than color, similar to that in Examples, but this method is a batch type polymerization method and uses water, and therefore the method requires the separation, washing and drying of a polymer and is high in production cost and is low in productivity. Moreover, in Comparative Example 4, since acrylonitrile remains excessively later in the polymerization because of limitations of reactivity ratio, polyacrylonitrile is produced and color is degraded and a desired composition distribution cannot be achieved. Furthermore, there arose an environmental problem that waste water of the steps contains acrylonitrile since unreacted acrylonitrile is dissolved in water.

Industrial Applicability

The thermoplastic copolymer obtained in accordance with the present invention can be blended with other resins and extruded to form a coating-resistant thermoplastic resin composition and can be used not only as interior parts but also as exterior parts in the fields of automobiles and motorcycles.

DESCRIPTION OF REFERENCE SYMBOLS (1) plunger pump
(2) tubular reactor with a static mixing structure therein
(3) tubular reactor with a static mixing structure therein
(4) gear pump
(5) side line
(6) tubular reactor with a static mixing structure therein
(7) tubular reactor with a static mixing structure therein
(8) preheater
(9) volatilizing apparatus
(10) gear pump
(i) loop reactor
(ii) plug flow reactor

The invention claimed is:

1. A method for producing a thermoplastic copolymer, comprising:
supplying a monomer mixture (a) comprising an aromatic vinyl monomer (a1) and a vinyl cyanide monomer (a2) to a mixing flow reactor to produce a copolymer (A), and supplying a polymerization solution comprising the copolymer (A) to an extrusion flow reactor to further polymerize the copolymer (A) to produce a copolymer (B).

2. The method for producing a thermoplastic copolymer according to claim 1, further comprising adding a monomer mixture (b) comprising an aromatic vinyl monomer (b1) to the polymerization solution comprising the copolymer (A).

3. The method for producing a thermoplastic copolymer according to claim 1, wherein the mixing flow reactor comprises a circulation-type loop reactor comprising two or more tubular reactors.

4. The method for producing a thermoplastic copolymer according to claim 1, wherein the mixing flow reactor comprises a circulation-type loop reactor comprising one or more tubular reactors with a static mixing structure therein.

5. The method for producing a thermoplastic copolymer according to claim 1, wherein the extrusion flow reactor comprises a serial type plug flow reactor comprising one or more tubular reactors with a static mixing structure therein.

6. The method for producing a thermoplastic copolymer according to claim 4, wherein the tubular reactor with a static mixing structure therein has a structure having a multiple-unit curved tube and a heat transfer area per a unit volume is 50 $m^2/m^3$ or more.

7. The method for producing a thermoplastic copolymer according to claim 1, wherein the reaction in the extrusion flow reactor is continued until a degree of polymerization of the copolymer (B) is 40 to 90% by weight.

8. The method for producing a thermoplastic copolymer according to claim 1, further comprising volatilizing the copolymer (B) formed in the extrusion flow reactor at a temperature of 100° C. or more and less than 300° C. at an atmospheric pressure (760 Torr) or less to separate an unreacted raw material mixture from the copolymer (B) and remove the unreacted raw material mixture.

9. The method for producing a thermoplastic copolymer according to a claim 1, wherein the copolymer (B) comprises 50 to 70 weight % of the aromatic vinyl compound and 30 to 50 weight % of the vinyl cyanide compound, and wherein the copolymer (B) comprises a portion having a vinyl cyanide composition that is higher by 2 weight % or more than that of an average vinyl cyanide content of the copolymer (B), and wherein said portion is 10 weight % or more of the copolymer (B).

10. The method for producing a thermoplastic copolymer according to claim 1, wherein the haze of the copolymer (B) is 5 or more.

11. A thermoplastic copolymer comprising 50 to 70 weight% of an aromatic vinyl compound and 30 to 50 weight % of an vinyl cyanide compound, and wherein the thermoplastic copolymer comprises a portion having a vinyl cyanide composition that is higher by 2 weight % or more than that of an average vinyl cyanide content of the thermoplastic copolymer, and wherein said portion is 10 weight % or more of the thermoplastic copolymer.

12. The thermoplastic copolymer of claim 11, wherein the haze of the copolymer is 5 or more.

13. The thermoplastic copolymer of claim 11, wherein the aromatic vinyl cyanide compound comprises an aromatic vinyl monomer (a1) and/or an aromatic vinyl monomer (b1), wherein the aromatic vinyl monomer (a1) is different from the aromatic vinyl monomer (b1).

14. The thermoplastic copolymer of claim 13, wherein the aromatic vinyl monomer (a1) is styrene, α-methylstyrene, p-methylstyrene, vinyltoluene, t-butylstyrene, o-ethylstyrene, o-chlorostyrene, o,p-dichlorostyrene, or combinations thereof.

15. The thermoplastic copolymer of claim 13, wherein the aromatic vinyl monomer (a1) is styrene, α-methylstyrene or combinations thereof.

16. The thermoplastic copolymer of claim 13, wherein the aromatic vinyl monomer (b1) is acrylonitrile, methacrylonitrile, ethacrylonitrile, or combinations thereof.

17. The thermoplastic copolymer of claim 13, wherein the aromatic vinyl monomer (b1) comprises acrylonitrile.

18. The thermoplastic copolymer of claim 13, wherein the aromatic vinyl monomer (a1) comprises styrene and the aromatic vinyl monomer (b1) comprises acrylonitrile.

19. The thermoplastic copolymer of claim 13, wherein the aromatic vinyl monomer (a1) comprises α-methylstyrene and the aromatic vinyl monomer (b1) comprises acrylonitrile.

20. The method for producing a thermoplastic copolymer according to claim 5, wherein the tubular reactor with a static mixing structure therein has a structure having a multiple-unit curved tube and a heat transfer area per a unit volume is 50 $m^2/m^3$ or more.

* * * * *